United States Patent [19]
Goldman

[11] 3,958,487
[45] May 25, 1976

[54] TEACHING DEVICE FOR MUSICAL INSTRUMENTS

[76] Inventor: Abraham Goldman, 105-54 Ave. K, Brooklyn, N.Y. 11236

[22] Filed: Feb. 18, 1975

[21] Appl. No.: 550,822

[52] U.S. Cl. ............................................... 84/478
[51] Int. Cl.² ........................................ G09B 15/08
[58] Field of Search ................. 84/470, 477 R, 478, 84/472, 485; 340/380; 350/96 B

[56] References Cited
UNITED STATES PATENTS

| | | | |
|---|---|---|---|
| 2,909,956 | 10/1959 | Radcliffe | 84/478 |
| 3,649,098 | 3/1972 | Suverison | 350/96 B |
| 3,709,085 | 1/1973 | Del Castillo | 84/478 X |
| 3,744,366 | 7/1973 | Del Castillo | 84/478 |

*Primary Examiner*—John F. Gonzales

[57] ABSTRACT

A teaching device for use with a musical keyboard or equivalent, such as a piano, organ or multistringed instrument; the device including a compact housing for containing control means, and indicating means including light emitting elements for positioning relative to the keys of a keyboard or selected positions on a multistringed musical instrument, and flexible optical cable means for transmitting light from a source to selected light emitting elements as determined by the operation of the control means.

2 Claims, 6 Drawing Figures

TEACHING DEVICE FOR MUSICAL INSTRUMENTS

BACKGROUND OF THE INVENTION

To facilitate the teaching of musical instruments of the keyboard type, such as pianos, organs, stringed instruments and the like; a number of expedients have been resorted to.

Thus, in one case, individual illuminating bulbs are located on the keyboard in positions relating to the individual keys. The control means for energizing selected bulbs in accordance with programming means reflecting a particular musical piece, exercise or the like, becomes quite involved requiring complex equipment. It follows that the association of such known teaching devices with a piano or the like is difficult, cumbersome, complex as to construction; requiring frequent maintenance, as well as entailing substantial expense.

Accordingly, an object of this invention is to provide an improved teaching device for association with musical instruments of the keyboard or multistring type, where the elements thereof are small in number, of simple construction and easily associated with the musical instrument; and of relatively low cost.

Another object of this invention is to provide a device of the character described, which includes light emitting elements and light receiving elements of a number corresponding to the number of keys of a keyboard, together with a flexible optical light transmitting cable for the interconnecting each of the light receiving means with a corresponding light emitting means; a constance source of light being disposed adjacent the light receiving elements, with programming means located between the light source and the light receiving elements; the programming means being opaque but formed with light transmitting openings arranged in a predetermined pattern so as to activate predetermined light receiving elements and corresponding light emitting elements.

A further object of this invention is to provide a device of the character described, wherein the light emitting elements may be disposed on a base member which may be removably associated with a keyboard, or, may be permanently related to the keys of the keyboard.

Another object of this invention is to provide a device of the character described, wherein the control means may be contained in a compact housing while the indicating means may take a simple form which allows for a flexible optical connection between the control means and the indicating means Still another object of this invention is to provide a device of the character described, wherein the light source is of constant illumination and intensity throughout the operation of the device, thereby eliminating switches and other control equipment; the light from such source being selectively transmitted to selected light emitting elements in a predetermined sequence and at very high speed.

Yet another object of this invention is to provide in a device of the character described, compact means for transmitting light to illuminate the light emitting means; such transmitting means comprising a flexible optical cable made up of separate constituent light transmitting elements, each such element being operative to optically connect a given light emitting element with a corresponding light receiving element.

Yet a further object of this invention is to provide a device of the character described, which lends itself to simple and speedy fabrication procedures; is made up of simple and inexpensive standard and readily available components; is economical to manufacture and therefore available at a relatively low cost to the user of the same.

Other objects of this invention are in part obvious and in part hereinafter pointed out.

DESCRIPTION OF THE PREFERRED EMBODIMENTS

The device of the instant invention is essentially a means for teaching the use of musical instruments of the keyboard type where the keys to be depressed in accordance with the musical piece or exercise to be played, are indicated in sequence by the illumination of individual light emitting means located in association with the respective keys.

The illumination of the light emitting means is controlled by the use of a central light source, a set of light receiving elements corresponding in number to the individual light emitting means, programming means in the form of preperforated sheets which are arranged for movement between the light source and the light receiving elements to thereby allow selected light receiving elements to be illuminated by way of the perforations in the programming sheets; flexible, multiunit optical cable means connecting the light receiving elements respectively with the light emitting elements.

Figure 1:
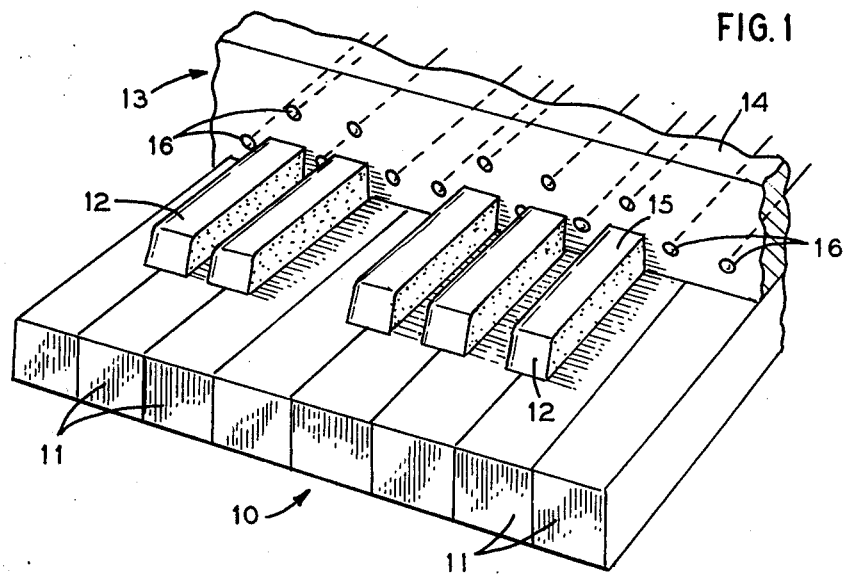
FIG. 1 is a partial perspective view of a piano keyboard having removably associated therewith the indicating portion of the teaching device embodying the invention.

Thus, as shown in FIG. 1, a conventional piano keyboard is indicated at 10; including keys 11, 12. Associated with keyboard 10 is key indicating means 13 which may be illuminated to show the specific keys 11, 12 to be depressed in sequence to thereby play a given musical piece or exercise.

Indicating means 13 takes the form of an elongated mounting strip 14 having a length comparable to that of the keyboard 10 and adapted to be removably associated with the rear portions of keys 11, 12 with cutouts 15 to accommodate keys 12. Strip 14 carries along the length thereof individual indicator elements 16; each element 16 being correlated to a particular key 11, 12 by proximity to the rear portions thereof. The elements 16 take the form of small illuminating members, hereinafter described in greater detail.

Figure 4:
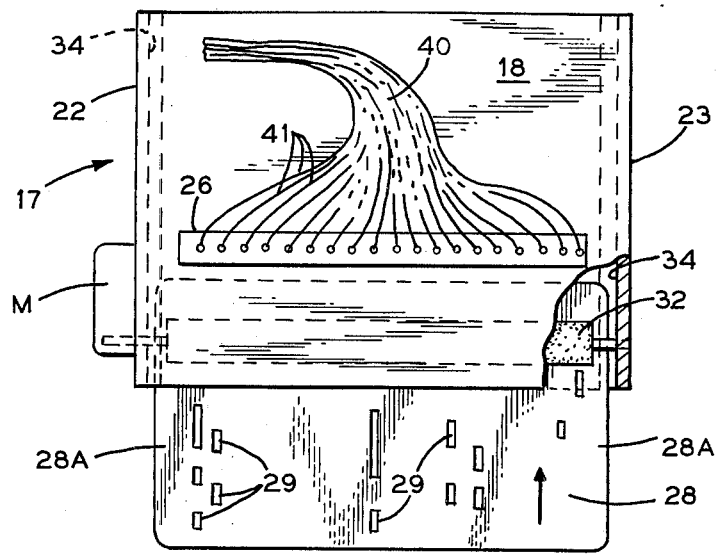
FIG. 4 is a top plan view showing the control portion of the teaching device, with parts broken away.
Figure 5:
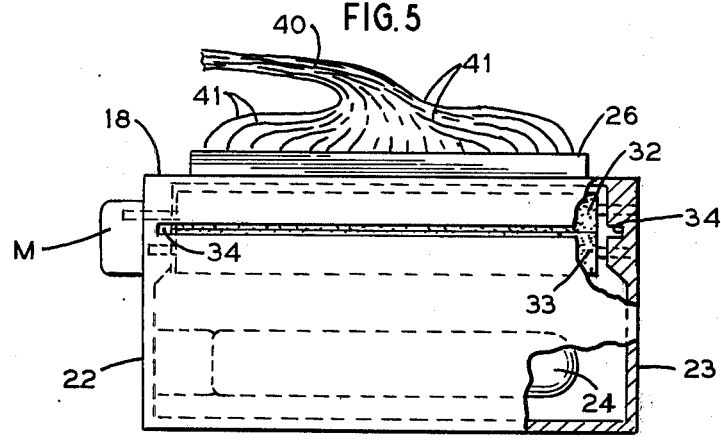
FIG. 5 is a front elevational view thereof with parts broken away.
Figure 6:
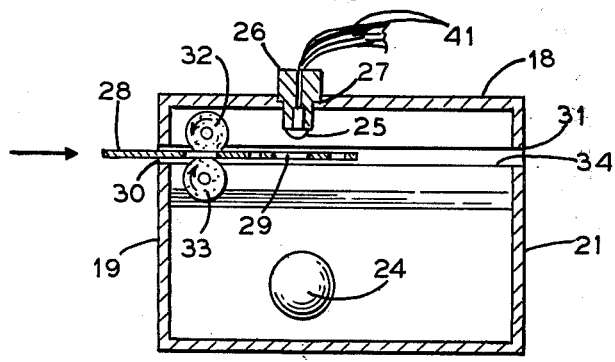
FIG. 6 is a sectional end view in elevation showing interior portions of the housing containing the control portion of the teaching device.

Means is provided for controlling the illumination of indicator elements 16. To this end, as shown in FIGS. 4-6, there is provided a control housing 17 having a top wall 18, front wall 19, bottom wall 20, rear wall 21 and end walls 22, 23.

Interiorly of housing 17 is disposed a single light source of constant intensity, such as a bulb 24 located adjacent bottom wall 20 and adapted to be suitably energized from a current source, not shown. A series of light receiving elements 25 are mounted in spaced arrangement on a plug in strip 26 which is located in an elongated slot 27 formed in top wall 18.

The light from bulb 24 is received by predetermined elements 25 in a determined sequence by suitable programming means which takes the form of sheets 28 having perforations 29 arranged in a predetermined pattern in accordance with the musical piece or exercise to be played.

Selected sheets 28 are fed into housing 17 by way of a slot 30 formed at the upper end of front wall 19 and out of said housing by way of a slot 31 formed at the upper end of rear wall. Movement is imparted to the selected sheets 28 by a pair of friction rollers 32, 33 one of which is a coupled to a small driver motor M mounted on end wall 22. The other roller may be suitably spring pressed toward the driven roller.

The side edge portions 28A of sheets are supported as they travel, in slots 34 formed in end walls 22, 23. Access panel means, not shown, may be provided in selected wall portions of housing 17 for replacing tube 24 when necessary.

Figure 3:
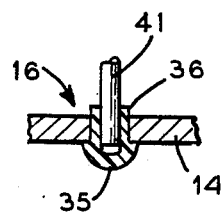
FIG. 3 is a sectional view of an element of the teaching device.

The light indicating members 16 take the form of plastic optical lenses 35 having tubular shank portions 36 which are adapted to be fitted into openings 37 in mounting strip. Illumination generated by light source 24 is adapted to be supplied to lenses 35. To this end there is provided a flexible light transmitting cable 40 made up of suitable glass fibers in individual units 41. The forward ends 41 of cable 40 are forced into the shank portions 36 of elements 16, FIG. 3.

Similar lenses such as lenses 35 form light receiving elements 25 and the rear ends of cable units 41 are suitably connected to such lenses; the illumination provided by bulb 24 can pass by way of the perforations 29 in programming sheet 28 to said light receiving elements 25 and thence by way of cable units 41 to the corresponding light emitting lenses 16.

Thus, as programming sheet 28 is moved through the housing 17, appropriate perforations 29 allow light to be passed by way of cable 40 to sequentially illuminate indicating elements 16, thereby indicating the specific keys 11, 12 to be depressed.

The housing 17 may be suitably located in association with the piano having keyboard 10 to minimize the total length of light transmitting cable 40. The housing 17 may be removable from such piano, together with the associated mounting strip 14.

Figure 2:
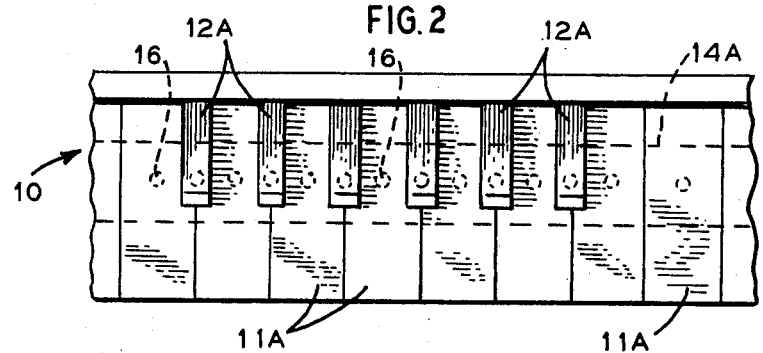
FIG. 2 is a top plan view of a piano keyboard wherein the indicating portion of the teaching device is disposed within the keyboard below the keys thereof, providing an alternative form of the invention.

Alternatively, as shown in FIG. 2, the mounting strip 14A may be mounted in the bed of the keyboard 10 with light emitting elements 16 are located in opposed relation to keys 11A, 12A which are translucent so as to be appropriately illuminated by elements 16, as described above. In this case, housing 17 may be fixed to suitable portions of the piano.

I claim:
1. A teaching device for use with a musical instrument having a plurality of keys comprising:
an indicating means for indicating sequentially the keys of said instrument to be actuated,
said indicating means including a mount which is independant of the musical instrument,
a plurality of separate light emitting elements respectively disposed in said mount adjacent the corresponding keys of said instrument,
a control means for activating said light emitting elements in a predetermined sequence to indicate the particular keys to be actuated,
said controll means including a housing remotely disposed relative to said mount,
a light bulb comprising a constant light source for illumination disposed in said housing,
a plurality of light receiving elements disposed in light transmitting relationship with respect to said light bulb,
an elongated fiber optic bundle interconnecting each of said light receiving elements with a corresponding light emitting element,
a programming means,
said programming means including a sheet of material having a series of light transmitting openings disposed in a predetermined pattern thereon,
said light transmitting opening being disposed in alignment with said light receiving elements,
drive means for imparting movement of said sheet through said housing between said light bulb and said light receiving elements whereby light from said light bulb is transmitted through said openings to said light receiving element when said opening is passing in alignment with said light receiving element whereby said light is directly transmitted to said light emitting element via said connecting bundle of fiber optics,
said drive means comprising a pair of drive rollers, and a motor means for driving one of said rollers; said driving means being actuated independently of of the musical instrument.

2. The invention as defined in claim 1 wherein each of said light emitting elements and light receiving elements comprises similar formed elements each having a lens portion and a connected tubular shank portion, said tubular shank portion of the respective elements being adapted to receiving the corresponding ends of said fiber optic bundle whereby the fiber optic bundle is frictionally secured to said elements.

* * * * *